US010113883B1

(12) United States Patent
Glasson

(10) Patent No.: US 10,113,883 B1
(45) Date of Patent: Oct. 30, 2018

(54) HYBRID SENSOR SYSTEM AND METHOD OF USE

(71) Applicant: Control Products, Inc., East Hanover, NJ (US)

(72) Inventor: Richard O. Glasson, Morris Plains, NJ (US)

(73) Assignee: Control Products, Inc., East Hanover, NJ (US)

( * ) Notice: Subject to any disclaimer, the term of this patent is extended or adjusted under 35 U.S.C. 154(b) by 162 days.

(21) Appl. No.: 14/991,503

(22) Filed: Jan. 8, 2016

(51) Int. Cl.
*G01B 7/14* (2006.01)
*G01D 5/14* (2006.01)
*G01B 7/30* (2006.01)

(52) U.S. Cl.
CPC .................... *G01D 5/14* (2013.01); *G01B 7/30* (2013.01)

(58) Field of Classification Search
CPC .......... G01P 3/443; G01P 3/488; G01P 3/487; G01P 3/481; G01P 3/685; G01P 1/026; G01P 3/66; G01P 3/68; G01P 3/665; G01D 5/14; G01D 5/145; G01D 5/147; G01D 5/2457; G01D 5/2013; G01D 5/2046; G01B 7/30; G01B 7/312; G01B 7/14
USPC ................ 324/173–174, 178–179, 161, 162, 324/207.11–207.26, 251–252, 256–262
See application file for complete search history.

(56) References Cited

U.S. PATENT DOCUMENTS 5,848,634 A * 12/1998 Will .................. E06B 9/174 160/1
6,234,061 B1    5/2001 Glasson
6,694,861 B2 * 2/2004 Glasson ................ F15B 15/283 33/763
7,093,361 B2    8/2006 Glasson
7,197,974 B2    4/2007 Glasson
7,290,476 B1   11/2007 Glasson
7,716,831 B2    5/2010 Glasson
7,855,552 B2 * 12/2010 Steinich ................ G01D 5/145 324/207.25
9,479,031 B2   10/2016 Beste et al.
(Continued)

OTHER PUBLICATIONS

M. Budimir, "Balluff's Explosion Proof Linear Transducer Offer Worldwide Hazardous Approval Ratings," Feb. 23, 2012.
(Continued)

*Primary Examiner* — Thang Le
(74) *Attorney, Agent, or Firm* — McGeary Cukor LLC; Vincent E. McGeary

(57) ABSTRACT

A precise and versatile hybrid sensor system and method of use that senses the location of a movable element traveling along a linear path. The system includes a magnetostrictive sensor along with a tried and proven converting mechanism that converts the linear movement of the movable element to rotational movement and then to a greatly reduced linear movement of a magnet that is directly proportional to the movement of the movable element. The magnetostrictive sensor has a sensor probe having an active length that is in close proximity and parallel to the movement of the magnet such that the magnetostrictive sensor can sense the location of the magnet to determine the location of the movable element. The magnetostrictive sensor is located exterior to the vessel to eliminate wiring within the vessel itself so as to allow the hybrid sensor to be readily used in difficult, high pressure or subsea environments.

16 Claims, 6 Drawing Sheets

(56) References Cited

U.S. PATENT DOCUMENTS

| | | | | |
|---|---|---|---|---|
| 2002/0074994 A1* | 6/2002 | Blubaugh | ............ | F15B 15/2892 |
| | | | | 324/207.13 |
| 2003/0136443 A1* | 7/2003 | Wain | ................... | B60N 2/0224 |
| | | | | 137/38 |
| 2004/0189284 A1* | 9/2004 | Haubold | ................. | F15B 15/10 |
| | | | | 324/207.2 |
| 2006/0285978 A1* | 12/2006 | Yajima | ................ | F15B 15/2861 |
| | | | | 417/63 |
| 2007/0244665 A1* | 10/2007 | Greer | ........................ | C23C 8/80 |
| | | | | 702/151 |
| 2009/0027044 A1* | 1/2009 | Hornung | .................. | G01D 5/06 |
| | | | | 324/207.2 |
| 2011/0067565 A1* | 3/2011 | Steinich | .................... | F15B 1/24 |
| | | | | 92/5 R |
| 2014/0173984 A1* | 6/2014 | Schlesiger | ........... | H02H 7/0851 |
| | | | | 49/28 |
| 2014/0252889 A1* | 9/2014 | Beste | ..................... | G01D 5/485 |
| | | | | 310/12.19 |
| 2016/0177982 A1* | 6/2016 | Kobayashi | .......... | F15B 15/2861 |
| | | | | 92/5 R |

OTHER PUBLICATIONS

MTS Sensors Staff, "High Accuracy ATEX-Certified Magnetostrictive Sensing Device," www.mtssensors.com, Apr. 20, 2015.
MTS Sensors Staff, "Magnetostriction: Basic Physical Elements," www.mtssensors.com.

\* cited by examiner

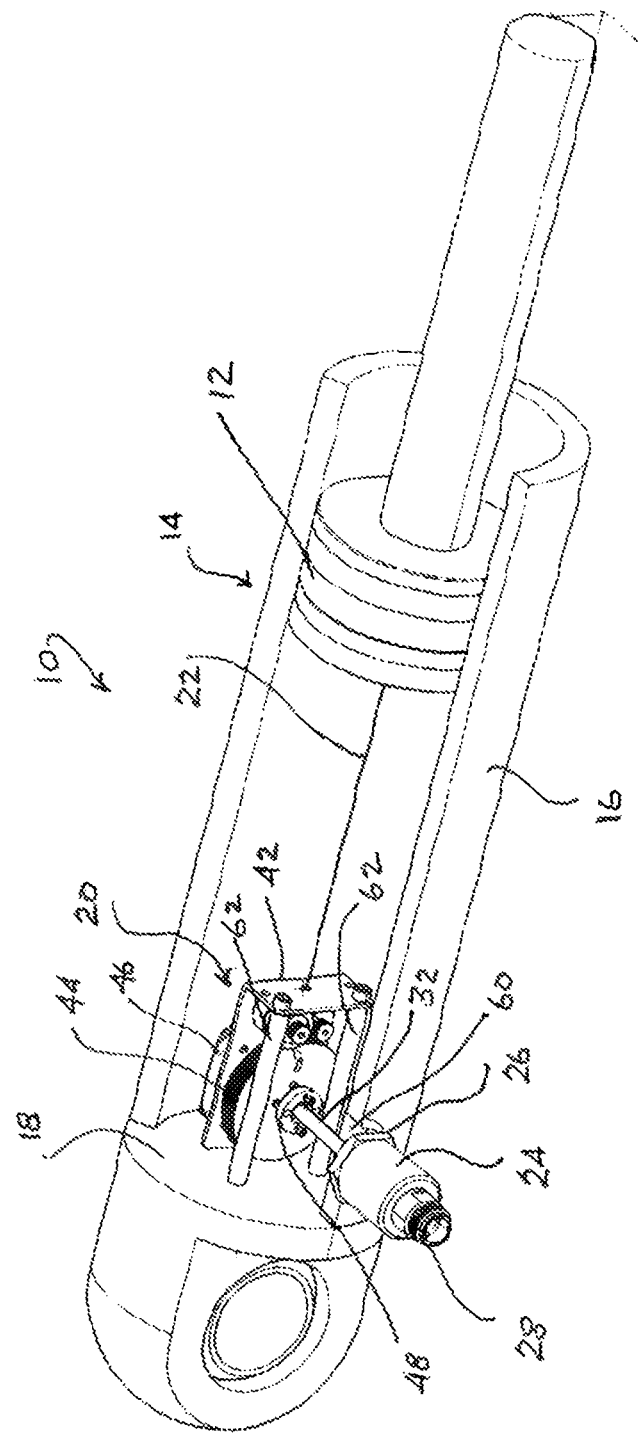

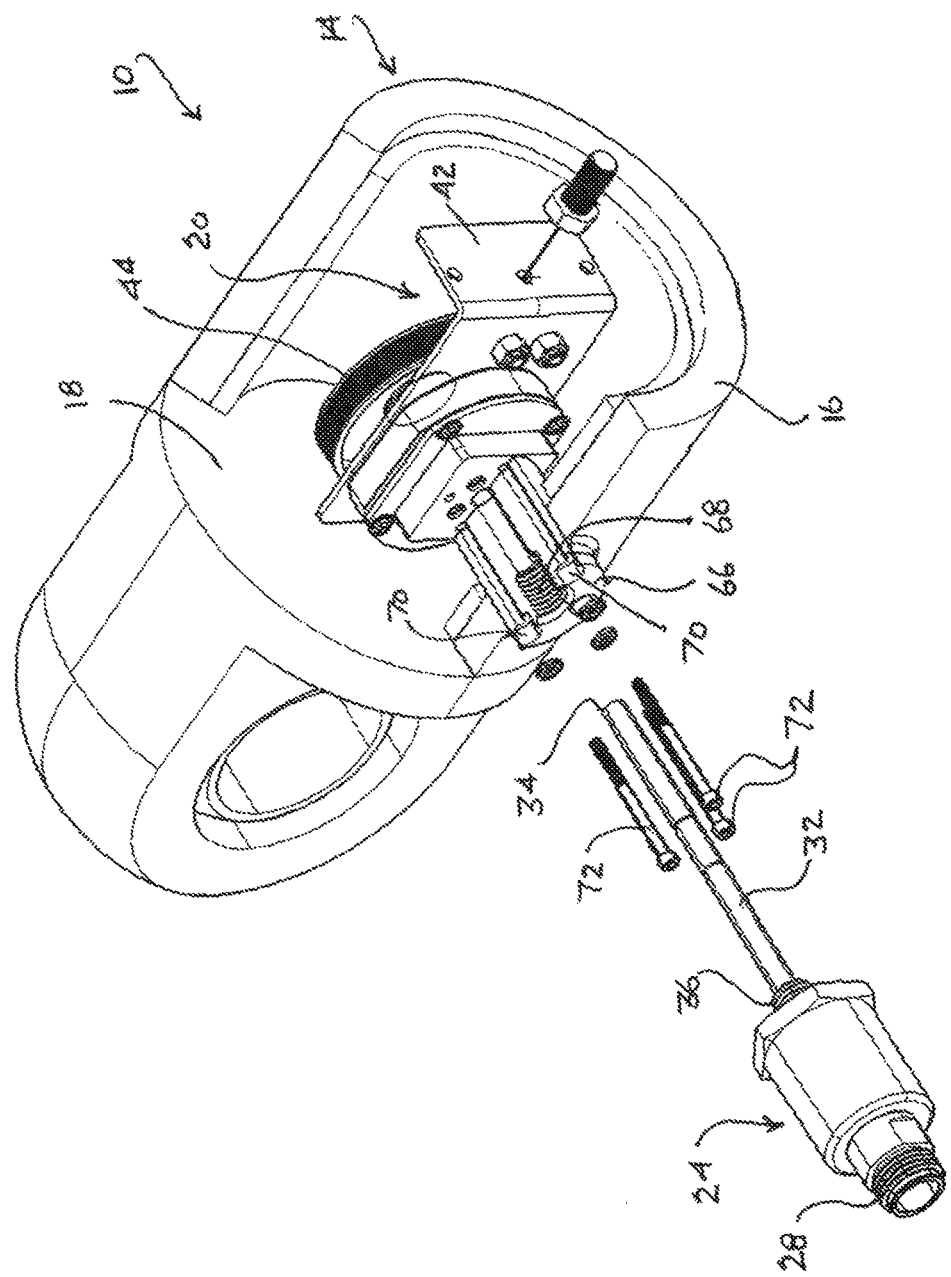

HYBRID SENSOR SYSTEM AND METHOD OF USE

FIELD OF THE INVENTION

The present invention relates to generally to position sensors, and more particularly, to a linear position sensor and a method of using the same for use in sensing the position of a movable element within a vessel.

BACKGROUND OF THE INVENTION

There are various systems and methods for sensing the position of a movable element within a vessel, among them the sensing of the position of a piston within a cylinder, such as a pressurized vessel.

The difficulty is in the sensing of a movable element that travels a relatively long distance and that distance needs to preferably be reduced to a relatively short linear path so that a short range transducer can be used to determine and sense the position of long range movable element by measuring a short linear path.

A precision sensor system that very effectively accomplishes the aforesaid object has been developed for sensing of the position of a movable element and that system is shown and described in U.S. Pat. No. 7,290,476 of Richard Glasson, entitled "Precision Sensor For a Hydraulic Cylinder". While the system disclosed in that patent is precise, well proven and valuable, one requirement is in the need for high pressure seals since the hydraulic cylinder may be under a substantial pressure and the sensing system components, such as the wiring, needs to pass from the high pressure environment within the cylinder to the ambient pressure exterior of the cylinder.

In the aforementioned Glasson '476 patent, there is a unique linear to rotary to linear wire extensometer mechanism, or converting mechanism, that allows long linear distances to be measured with the use of a short range transducer, such as a linear variable differential transducer (LVDT). Such systems have many uses, such as in hydraulic cylinders and hydraulic accumulators where the installation of a long linear sensor is not practical or technically prudent.

While useful in a large number of hydraulic cylinder and accumulator applications, there are some application cases in which the precision sensor of the Glasson patents could be improved through the substitution of a different type of short-range transducer (other than the LVDT).

In particular, with the system as described in the aforesaid patents, in high pressure applications, some of the electrical wiring is located inside the pressurized vessel and therefore subjected to the rigorous conditions and operating environment within the vessel. In addition, those wires require specialized wire connectors to allow the wires to pass through the cylinder wall to the exterior ambient pressures. Further, in the system of the Glasson patent, for some applications, the sensor is subjected to water, aqueous, ionic or corrosive liquids and, additionally, necessitates an external signal-conditioning electronic module.

It would be, therefore, advantageous to have an improved system and method that uses the efficient converting mechanism with a linear to rotary to linear draw wire extensometer system and to improve the performance and uses of the sensor, even for difficult or hazardous environments.

SUMMARY OF THE INVENTION

The primary mechanism of the present hybrid sensor system remains the compact linear to rotational to linear draw wire converting mechanism, which is different from all standard draw wire extensometers in that it provides the short-range linearly-translating axis, to which suitable short-range transducer may be applied to achieve long-range sensing in an advantageous package, without requiring the use of a long-range linear sensor system or the modifications and reliability problems that those long-range sensors typically incur. The additional uses that may benefit from the use of an alternate short-range transducer include sub-sea pressure vessels, systems using water (aqueous) and water-based hydraulic fluids, certain hazardous location cases, and others.

For these cases, an improved version of the sensor system utilizes a magnetostrictive-type transducer. The magnetostrictive transducer would be installed along the transverse linear axis of the linear to rotary to linear converting mechanism, in place of the LVDT of the Glasson '476 patent. In the examples according to the invention, the technical benefits are (a) no need for wires or electrical connectors exposed to the operating environment of the sensor system (such as inside of a hydraulic cylinder); (b) no need for a high-pressure electrical connector; (c) operable in water, aqueous, ionic, or corrosive liquids and (d) no need for a separate signal-conditioning electronics module.

Magnetostrictive sensor technology has received significant R&D and market-driven product enhancement over the course of many years. The technology teaches the magnetostrictive sensor as a long-range sensor (mounting the rod along the length of a cylinder). In addition to the technical benefits described above, magnetostrictive sensors are available with a wide array of enhancements such as Intrinsic Safety ratings, multiple industry-standard operating modes, automatic calibration, and redundancy to name just a few. Magnetostrictive cylinder sensor technology has not been considered combinable with other sensing technologies, and, in the application of pressurized cylinders, has been considered a complete solution. In this regard, the magnetostrictive sensor is configured to sense directly the translation of a piston with respect to a cylinder. The present invention combines the benefits of magnetostrictive transducers with the benefits of the LRL draw wire converting mechanism to achieve the heretofore unknown benefits disclosed herein and other benefits which may become apparent from the inventive disclosure.

In essence, the present invention is a unique combination of a tried and proven converting mechanism, as described in the Glasson '476 patent, where linear movement of a movable element is converted to rotational movement and then to linear movement of a reduced path length together with a magnetostrictive sensor technology offering.

As a result of the foregoing characteristics of the present hybrid sensor system, the system can be used in a number of otherwise difficult environments. One such environment is in subsea applications.

There are many cases in which a sensor system with a waterproof external electrical connector is useful. If water is allowed to enter a sensor or an electrical connector it will damage the conducting elements inside causing signal degradation or total failure. This is especially true of salt water. In subsea applications there is the added requirement that the external system elements, such as electrical connections, are subjected to extreme pressure as a result of being deployed in deep water.

A typical subsea system would include a pressure vessel (hydraulic cylinder or accumulator), a linear sensor system deployed inside the pressure vessel (the present hybrid sensor), and a means of electrically-connecting the internal sensor to an external cable or wiring harness for the purpose of conveying the sensor signal to its intended end use. As examples, a subsea application of the present invention is suitable for uses such as oil rig equipment, shipboard harsh environments, submerged dam gates, subsea power generation, submerged industrial tank applications, storage tank monitoring as well as generally extreme environments including, but not limited to, high humidity, rain and salt spray.

The present invention is operable in environments such as air, salt water, fresh water, process chemicals, ionic and corrosive fluids, petroleum products, sewage, gray water and others and may be capable of operating in subsea depths of 0 feet below the surface to 11,000 feet in its standard form and, if modified such as by adding heavier tubing around the magnetostrictive probe, can be usable at 20,000 feet below the surface with pressure at approximately 10,000 psi. At 50 feet of depth the pressure is about 37 psi; at 5000 ft of depth, the pressure is about 2200 psi and at 11,000 ft. of depth, the pressure is about 5000 psi.

The subsea sensor use-case is among the most technically-challenging because: (a) the required electrical connection must resist extreme internal pressure inside the vessel; (b) the required electrical connection must resist extreme external pressure outside the vessel; (c) the system may use water-based (aqueous) working fluids inside the pressure vessel, meaning there can be no exposed electrical elements or connectors inside the vessel; (d) the external environment is salt water, which is extremely damaging to everything, especially electrical elements and (e) the typical subsea pressure vessel is subject to varying pressure regimes depending upon whether it is at the surface (extreme internal pressure, low external), or deep under the sea (extreme external pressure, varying internal pressure depending on operational mode).

As to challenge (e) above, the subsea environment requires an extreme-pressure signal interface that can withstand pressure from either side (external or internal). There are no practical commercially-available connectors that can resist extreme pressure in two directions. There is the further requirement that no connector elements, solder joints, exposed wires, terminals, may be exposed to the working fluid inside the pressure vessel. There are no commercially available systems that do this.

As will be seen herein, the present hybrid sensor system overcomes the aforedescribed challenges by utilizing a magnetostrictive sensor using the converting mechanism of the Glasson '476 patent to achieve a pressure seal to the internal pressure of the vessel and eliminate the need of wiring passing through a pressure seal. In addition, a magnetostrictive sensor transducer is provided with a head that is suitable to resist high external pressure and can be constructed of 316 stainless steel or "super alloy" such as inconel, that is suitably thick and is welded to produce a strong corrosion-resistant housing.

Tese and other features and advantages of the present invention will become more readily apparent during the following detailed description taken in conjunction with the drawings herein.

BRIEF DESCRIPTION OF THE DRAWINGS

FIG. 6 is a perspective view illustrating in line mounting system for the converting mechanism of the present invention; and FIG. 7 is an exploded view showing the side mounting system for converting mechanism of the present invention.

DETAILED DESCRIPTION OF THE INVENTION

Figure 1:
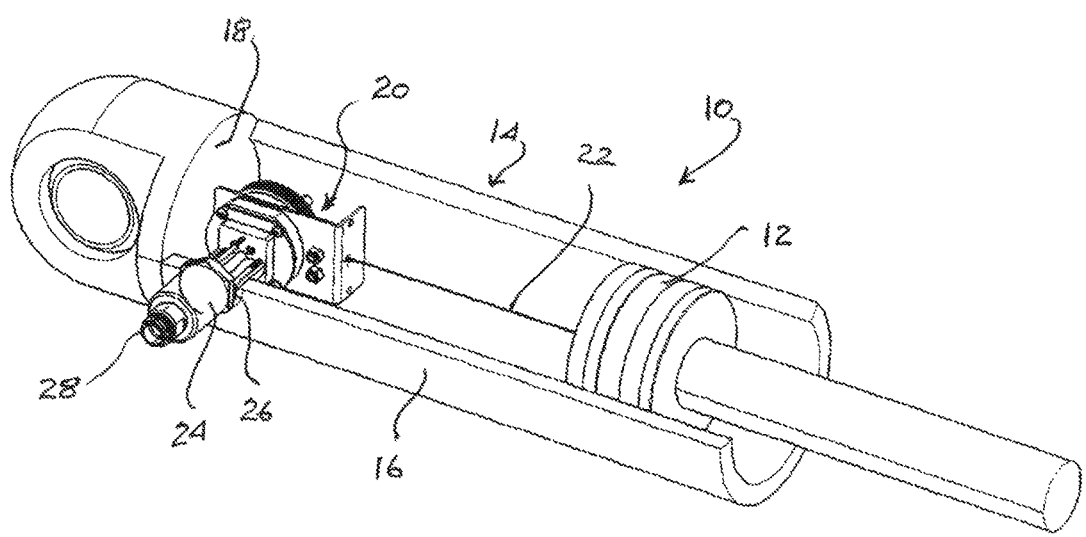
FIG. 1 is a perspective view, partially cutaway, showing the hybrid sensor system of the present invention.

Referring now to FIG. 1, there is shown a perspective view, cutaway, illustrating the hybrid sensor system 10 of the present invention. As can be seen, the hybrid sensor system 10I includes a movable element that is contained within a vessel having a vessel wall. In the exemplary embodiment of FIG. 1, the movable element is a piston 12 traveling along a linear path within a cylinder 14. The cylinder wall 16 is cylindrical and there is a closed end 18 of the cylinder 14.

As will be seen, for purposes of illustrating and explaining the present invention, the exemplary embodiment is shown as a cylinder within which a piston moves linearly, however, it will be seen that the present invention is applicable to other movable elements within a vessel, including installation (a) inside an accumulator (a high pressure energy storage vessel with a movable piston or bladder, (b) inside a "remote" pressure-capable housing and using a conduit, pipe, or other with a (c) pressure-capable connection to convey a draw wire to the primary pressure vessel of either (a) or (b). The vessel itself may be pressurized, may be operating at ambient pressure or even a under a vacuum.

As also can be seen in FIG. 1, there is a converting mechanism 20 that is mounted within the cylinder 14 and is attached directly to the piston 12 by means of a flexible connector 21 such that the linear movement of the piston 12 is directly translated to the converting mechanism 20. The converting mechanism 20 may; as shown in the exemplary embodiment of FIG. 1, be affixed to the cylinder wall 14 or, alternatively, affixed to the closed end 18 of the cylinder 14.

As used herein the term "converting element" shall include the module or mechanism that converts the linear movement of the piston to rotational movement and then to linear movement, thus a linear to rotational to linear (LRL) mechanism. The converting mechanism 20 of the present invention is similar to the same element shown and described fully in the Glasson '476 patent and any differences will be explained herein.

A magnetostrictive sensor 24 is provided and is in a fixed location with respect to the converting mechanism 20. As seen in FIG. 1, the magnetostrictive sensor 24 is affixed to the cylinder wall 14 and there is a pressure seal 26 between the magnetostrictive sensor 24 and the cylinder wall 16. The pressure seal 26 can be an O-ring with a pressurized or non-pressurized cylinder 14. If the cylinder 14 is not pressurized, the O-ring is still useful to seal the connection to prevent contaminants from passing into the cylinder 14 or other vessel.

In addition, the magnetostrictive sensor 24 has an electrical connector 28 that provides a connection to an external monitor or read-out device to receive and display the signals from the magnetostrictive sensor 24 indicative of the position of the piston 12. Since the wires that connect to the electrical connector 28 are not subject to pressure, there need not be a special connector.

One use already described, however, of the present hybrid sensor system 10 is in deep sea environments, and, in such cases, the electrical connector 28 can be a specialized subsea electrical connector, such as a connector commercially available as SeaCon MSXEE-BCR connector.

Figure 2:
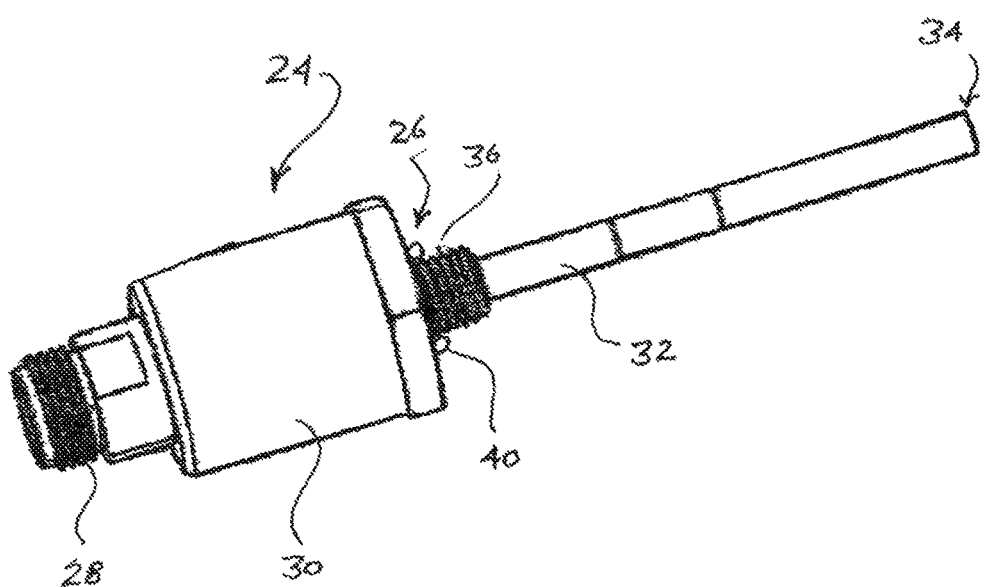
FIG. 2 is a perspective view of a magnetostrictive sensor that can be used with the present invention.

Turning then to FIG. 2, there is a perspective view of the magnetostrictive sensor 24 that can be used with the present invention. As can be seen, the magnetostrictive sensor 24 includes an electronics head 30 and a sensor probe 32 that extends outwardly from the electronics head 30 ending in a distal end 34. The magnetostrictive sensor 24 also includes external screw threads 36 to facilitate affixing the magnetostrictive sensor 24 to a housing or other foundation. The electrical connector 28 is shown located at the proximal end 38 of the magnetostrictive sensor 24. The pressure seal 26 is also shown and in the exemplary embodiment of FIG. 2, the pressure seal 26 is an O-ring 40.

Magnetostrictive sensors 24 are available commercially. Basically they sense the presence of a magnetic field proximate to the sensor probe and produce a signal that is representative of the location of that magnetic field along the active length of the sensor probe. Magnetostrictive sensors suitable for use with the present invention are available from numerous sources including MTS Sensor Technologie GmbH & Co, of Germany and Balluff Inc.

Figure 3:
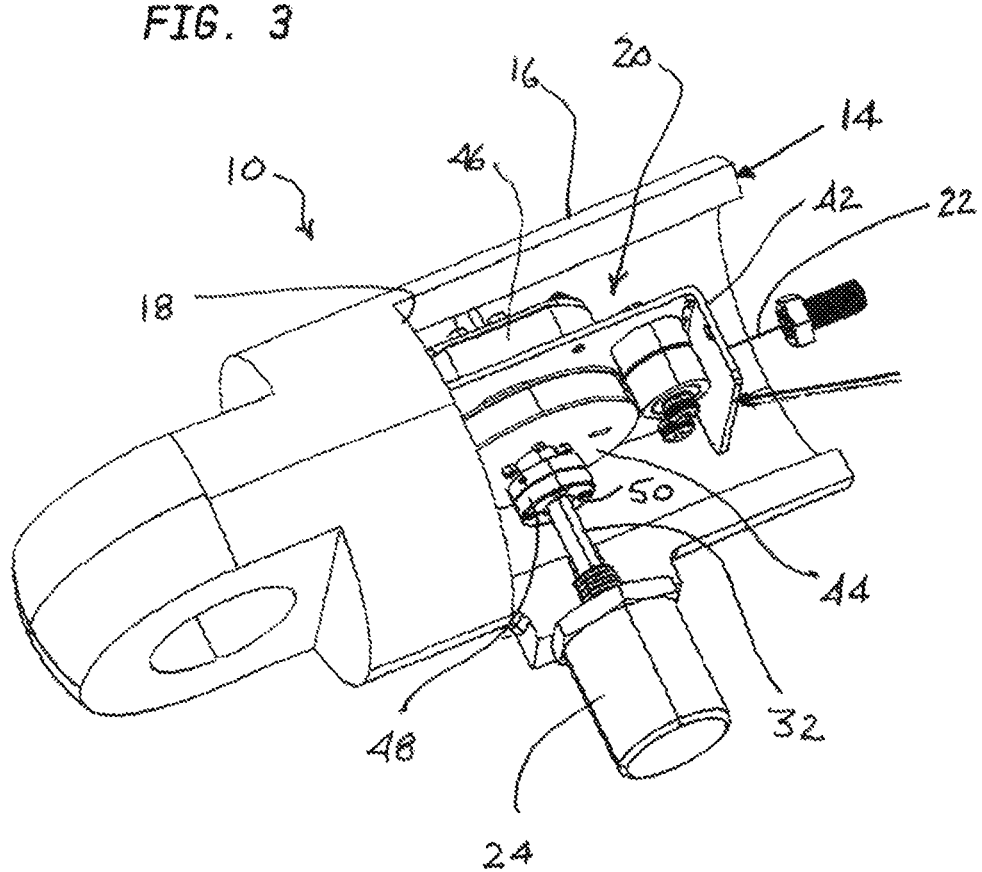
FIG. 3 is a perspective view, partially cut-away, showing the converting mechanism of the present invention.

Turning to FIG. 3, taken along with FIG. 1, there is shown a perspective view, partially cut-away, illustrating the converting mechanism 20 coupled to the magnetostrictive sensor 24 of the exemplary embodiment according to the present invention. As can be seen, the converting mechanism 20 comprises an L-shaped frame 42 that holds a wire spool 44 that is free to rotate about a central axis. The flexible connector 22 is, in the exemplary embodiment, a wire that is coiled around the wire spool 44 and winds and unwinds as the piston 12 moves along a linear path within the cylinder 14.

The converting mechanism is basically shown and described in the aforementioned U.S. Pat. No. 7,290,476 of Glasson and includes a recoil device 46 to allow the flexible connector 22 to wind and unwind around the wire spool 44 as the piston 12 moves linearly. Again, the details of the wire spool 44 and the recoil device 46 are well described in the Glasson '476 patent.

With the present invention, however, there is a permanent ring magnet 48 that moves linearly in direct proportion to the rotational movement of the wire spool 44 and, consequently, in direct proportion to the linear movement of the piston 12 within cylinder 14.

In short, the convening mechanism 20 thus converts the linear movement of the piston 12 to the rotational movement of the wire spool 44 and then to linear movement of the ring magnet 48 such that the ring magnet 48 moves in direct relationship to the movement of the piston 12 but with less linear movement.

Accordingly, the magnetostrictive sensor 20 senses the movement of the ring magnet 48 to accurately determine the position of the piston 12. To that end, the ring magnet 48 has a central circular opening 54 through which the sensor probe 32 extends. The longitudinal axis of the sensor probe 32 is coaxial with the rotational axis of the wire spool 44 and the ring magnet 48 and, therefore, moves in close proximity to the sensor probe 32, and, in this case, the ring magnet 48 actually surrounds the sensor probe 32, so that the magnetostrictive sensor 24 senses the location of the ring magnet 48 to accurately determine the position of the piston 12 in cylinder 14. In the embodiment according to the invention, this application of magnetostrictive technology with LRL conversion elements previously described by Glasson provides the unforeseen and unexpected benefits of robustness and for subsea application (for example) as previously described.

Figure 4:
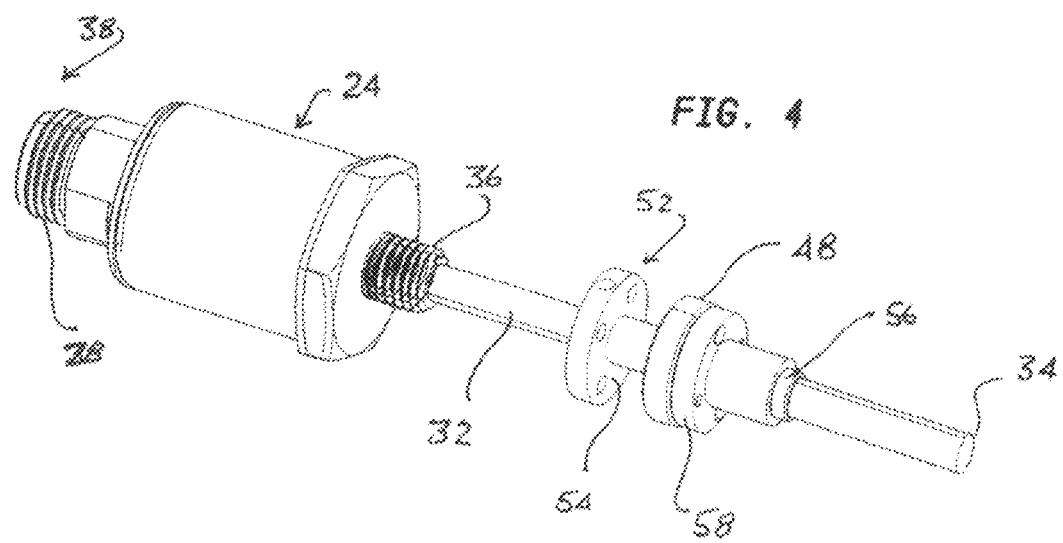
FIG. 4 is a perspective view of certain of the elements used in constructing the present invention.

Turning then to FIG. 4, taken along with FIGS. 1-3, there is a perspective view of some of the elements of the converting mechanism 20 of the present invention to illustrate their relative movements. In particular, the magnetostrictive sensor 24 is shown along with the sensor probe 32 extending therefrom and the sensor probe 32 can be seen to pass through the ring magnet 48. In the exemplary embodiment, there is a stationary bushing 52 that is immovably affixed to the sensor probe 32, however the stationary bushing 52 could be affixed to another element in a stationary position. The stationary bushing 52 has a circular flange 54 and an elongated cylindrical member 56 that extends toward the distal end 34 of the sensor probe 32. The stationary bushing 52 has external threads formed thereon. The ring magnet 48 is affixed to a rotating hub 58 that has internal threads that mesh with the external threads of the stationary bushing 52.

Accordingly, when the rotating hub 58 and the ring magnet 48 are rotated, the cooperating meshing between the internal threads of the rotating hub 58 and the external threads of the stationary bushing 52 causes the rotating hub 58 and the ring magnet 48 to move linearly along the length of the sensor probe 32.

Figure 5:
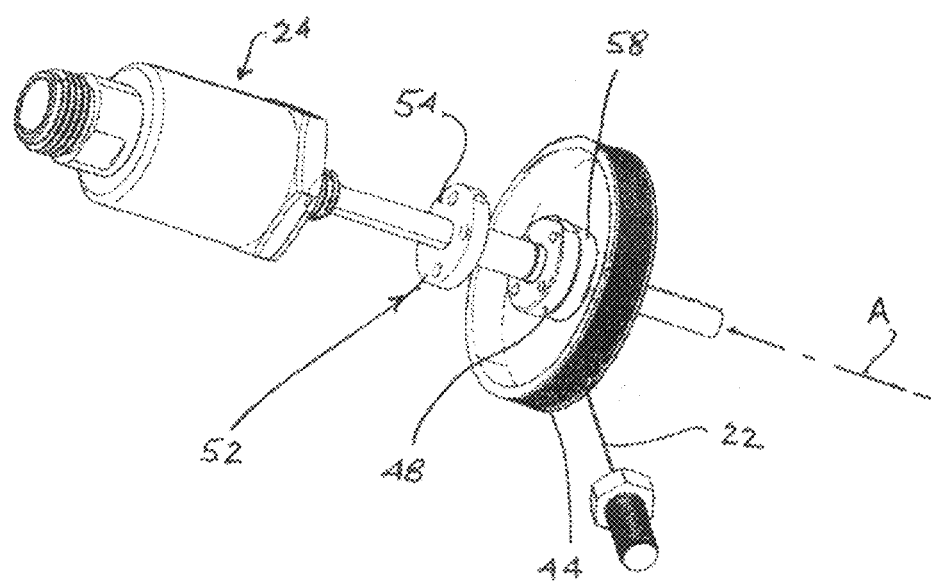
FIG. 5 is a perspective view of further elements used in constructing the present invention.

In FIG. 5, taken along with FIGS. 1-3, there is a perspective view showing the elements of FIG. 4 along with the wire spool 44 to show the relationship between the wire spool 44 and the movement of the ring magnet 48. As such, the rotating hub 58 and the ring magnet 48 are affixed together and also to the wire spool 44. Thus, as the flexible connector 22 is wound or unwound on the wire spool 44, the wire spool 44 rotates about its rotational central axis A. That rotational movement is therefore communicated to the ring magnet 48 that is caused to move linearly along the sensor probe 32 in a direct relationship to the linear movement of the piston 12 within cylinder 14.

In the design of the linear to rotational to linear converting mechanism 20, the diameter of the wire spool 44 and the distance between threads (threads per inch) of the mating threads of the rotatable hub 58 and the stationary bushing 52 enables the linear movement of the piston 12 to be proportionally transmitted to the linear movement of the ring magnet 48 so that the ring magnet 48 remains within the sensitive portion of the sensor probe 32.

In order to make the result and dimensional parameters operable, the longitudinal axis of the sensor probe 30 is aligned with and coaxial with the rotational central axis A of the wire spool 44. In the exemplary embodiment the longitudinal axis of the sensor probe is at a right angle to the path of the movement of the piston 12.

The mounting of the converting mechanism 20 to the cylinder 14 can be carried out in at least two ways. In either installation, it is important that the magnetostrictive sensor 24 be precisely aligned with the rotational axis of the wire spool 44 and that the converting mechanism 20 be aligned with the center axis of the cylinder 14, in line with the center of the piston 12 to which the flexible connector 22 is attached.

In addition, it is preferable to provide a mounting means for the converting mechanism 20 which requires the least departure from standard pressure vessel design practice.

That means the fewest possible extra mounting holes or special design features in addition to the standard pressure vessel not having a magnetostrictive sensor 24 installed.

In FIG. 6 there is a perspective view, partially cut away, illustrating the in line mounting system and which mounts the converting mechanism 20 to the closed end 18 of the cylinder 14 and the magnetostrictive sensor 24 to the cylinder wall 16.

The in line mounting system comprises a single, threaded boss 60 welded to the cylinder wall 16. The threaded boss 60 has a central, threaded opening that passes though the cylinder wall 16, perpendicular to the axis of movement of the piston 12. As can be seen in FIG. 6, the converting mechanism 20 is affixed inside the cylinder 14 by means of two long mounting bolts 62. There may also be spacers to correct for the length of the mounting bolts 62. The mounting bolts 66 pass through the L-shaped frame 42 and are threadedly secured into the closed end 18 of the cylinder 14 to firmly affix the converting mechanism 20 therein.

The magnetostrictive sensor 24 is installed through the threaded opening in the threaded boss 60 such that the sensor probe 32 extends through the ring magnet 48. With the installation, precise mechanical alignment is needed between the sensor probe 32 and the converting mechanism 20 and that precision alignment depends on the relative location of the threaded boss 60 and the installed convening mechanism 20.

The central, threaded boss 60 can be a standard, high-pressure sealed, installation mode for a magnetostrictive sensor and would be described commonly as a ¾-16 (SAE thread) or 18 mm (metric thread) o-ring port and which are common connection elements. The converting mechanism 20 may be advantageously located along the central axis of the cylinder 14 by means of specifically locating threaded holes in the closed end 18 of the cylinder 14 that receive the mounting bolts 62.

In the assembly, the length of the sensor probe 32 of the magnetostrictive sensor 24 can be sized accordingly to maintain the central alignment with the cylinder 14.

Turning then to FIG. 7, there is an exploded view of the present invention, partially cut away, illustrating the side mount installation. The side mount installation uses a threaded boss 66 having a central, threaded opening 68. In the case of the side installation, however, the threaded boss 66 is a custom construction and includes four counter bored bolt holes 70 (only two of which are shown in FIG. 7) disposed in a symmetrical pattern surrounding the central threaded opening 68.

As shown, the converting mechanism 20 is secured inside the cylinder 14 by 4 socket head cap screws 72 (only three of which are shown) that are inserted from the outside of the cylinder 14 and pass through the counter bored bolt holes 70 in the threaded boss 66 to be screwed into suitable threaded openings in the converting mechanism 20.

This means of attachment maintains a precise mechanical alignment between the magnetostrictive sensor 24 and the converting mechanism 20 because both elements are attached to the same machined part. The socket head cap screws 72 may have high-pressure sealing washers (not shown) under their heads as is conventional. The central, threaded opening 68 can be the standard, high-pressure sealed, installation mode for a magnetostrictive sensor. It would be described commonly as a ¾-16 (SAE thread) or 18 mm (metric thread) o-ring opening and both are common to the practice.

In this way, the magnetostrictive sensor 24 and the converting mechanism 20 are coupled and aligned mechanically, via sealed, threaded elements, and using only a single threaded boss 66 which is affixed to the cylinder 14 according to common design practice.

Furthermore, it can be seen that the converting mechanism 20 may be advantageously located along the central axis of the cylinder 14 by simple means of varying the length of the threaded boss 66 extending inside the cylinder 14. The length of the sensor probe 32 of the magnetostrictive sensor 24 and length of the socket head cap screws 72 would be sized accordingly to maintain the central alignment of the converting mechanism 20 within the cylinder 14.

Though there are potentially several different pressure vessel diameters, in practice there are only a few typical sizes covering the majority of applications. Moreover, the magnetostrictive sensors of varying probe length in this invention would be nevertheless of a class, being very short. These short magnetostrictive sensors are relatively inexpensive to produce and are robust and easy to ship due to their short size.

The threaded boss 66 in varying lengths is likewise easy to produce using common skill and could also work with the addition of a spacer on the inner end, so that spacer would be the variable-length part to reduce costs. A further cost reduction may be realized through the use of an extruded metal spacer that could be cut-to-length. Finally, this side mount installation eliminates the need for any additional holes or features anywhere on the cylinder 14.

Either the in line installation or the side installation methods are suitable and each benefits from the aspects of the present sensor system including: no wires internal to the pressure vessel, no high-pressure wiring connector, the ability to operate in almost any fluid including ionic and oxidizing environments, no separate signal conditioner, and the ability to incorporate a subsea or other special-purpose electrical connector directly to the outside end of the magnetostrictive sensor.

Those skilled in the art will readily recognize numerous adaptations and modifications which can be made to the hybrid sensor system and method of use which will result in an improved system and method yet all of which will fall within the scope and spirit of the present invention as defined in the following claims. Accordingly, the invention is to be limited only by the following claims and their equivalents.

What is claimed is:

1. A system for sensing a position of a movable element within a vessel having a vessel wall and a closed end, the system comprising:
   a flexible connector having a first end attached to the movable element;
   a rotatable element positioned within the vessel and coupled to a second end of the flexible connector, the rotatable element rotating about an axis, the rotation of the rotatable element moving a magnet along a linear path a distance proportional to the movement of the movable element;
   a magnetostrictive sensor affixed to the vessel wall and having a sensor probe extending into the vessel, the sensor probe being located in close proximity to the magnet to sense the position of the magnet;
   the magnetostrictive sensor sensing the position of the magnet to determine the position of the movable element.

2. The system of claim 1 wherein the magnet has a central opening and the sensor probe passes through the central opening in the magnet.

3. The system of claim 1 wherein the vessel is a cylinder and the movable element is a piston moving within the cylinder.

4. The system of claim 1 wherein the rotatable element is rotatably affixed to the closed end of the vessel.

5. The system of claim 1 wherein the rotatable element is rotatably affixed to the vessel wall.

6. The system of claim 1 wherein the movable element moves along a linear path and wherein the sensor probe is oriented in a fixed position having its longitudinal axis at about a 90 degree angle with respect to the linear path of the movable element.

7. The system of claim 1 wherein the magnet moves linearly in a path aligned with the central axis of the rotatable element.

8. The system of claim 1 wherein the magnetostrictive sensor is affixed to the vessel wall and a pressure seal is provided between the magnetostrictive sensor and the vessel wall.

9. A method of sensing a position of a movable element moving linearly, the method comprising the steps of:
   providing a vessel having a vessel wall and a closed end, a flexible connector having a first end attached to the movable element and a rotatable element positioned within the vessel and coupled to a second end of the flexible connector, the rotatable element rotating about an axis;
   communicating a magnet with the rotatable element to move linearly and proportionally in response to the rotational movement of the rotatable element;
   affixing a magnetostrictive sensor having a sensor probe extending therefrom to the vessel wall to position the sensor probe in proximity to the magnet;
   using the magnetostrictive sensor to sense the position of the magnet relative to the sensor probe to determine the location of the movable element.

10. The method of claim 9 wherein the step of communicating a magnet with the rotatable element to move linearly in response to the rotational movement of the rotatable element comprises communicating a magnet having a central opening formed therein and the step of affixing a magnetostrictive sensor to the vessel wall comprises affixing the magnetostrictive sensor to position the sensor probe within the central opening in the magnet.

11. The method of claim 9 wherein the step of affixing the magnetostrictive sensor to the wall of the vessel comprises aligning the sensor probe to be directed toward the rotational axis of the rotatable element.

12. The method of claim 9 wherein the step of providing the rotatable element positioned within the pressurized vessel comprises affixing the rotatable element to the closed end of the vessel.

13. The method of claim 9 wherein the step of providing a rotatable element positioned within the pressurized cylinder comprises affixing the rotatable element to the vessel wall.

14. The method of claim 9 wherein the step of affixing the rotatable element to the vessel wall comprises providing a boss affixed to the rotatable element and affixing the boss to the vessel wall.

15. A system for sensing a position of a movable element in a cylinder having an axial length comprising:
   a flexible connector having a first end attached to the movable element;
   a converting system coupled to the second end of the flexible connector, the converting system moving a magnet along a linear path a distance proportional to the movement of the movable element in a direction substantially perpendicular to the axial length of the cylinder;
   a magnetostrictive sensor having a substantially linear sensor probe, the sensor probe being located in close proximity to the magnet and extending into an interior of the cylinder in a direction perpendicular to the axial length of the cylinder;
   the magnetostrictive sensor sensing the position of the magnet to determine the position of the movable element.

16. The system of claim 15 wherein the converting system comprises a rotatable element coupled to the second end of the flexible connector, the rotatable element rotating about an axis, the rotation of the rotatable element moving a magnet along a linear path a distance proportional to the movement of the movable element.

* * * * *